US011889259B2

(12) United States Patent
Tanaka et al.

(10) Patent No.: US 11,889,259 B2
(45) Date of Patent: Jan. 30, 2024

(54) SPEAKER UNIT AND SPEAKER

(71) Applicant: SOUND FUN CORPORATION, Tokyo (JP)

(72) Inventors: Hiroshi Tanaka, Tokyo (JP); Masahiro Suzuki, Tokyo (JP)

(73) Assignee: Sound Fun Corporation, Tokyo (JP)

( * ) Notice: Subject to any disclaimer, the term of this patent is extended or adjusted under 35 U.S.C. 154(b) by 0 days.

(21) Appl. No.: 17/761,010

(22) PCT Filed: Sep. 14, 2020

(86) PCT No.: PCT/JP2020/034790

§ 371 (c)(1),
(2) Date: Mar. 16, 2022

(87) PCT Pub. No.: WO2021/054295

PCT Pub. Date: Mar. 25, 2021

(65) Prior Publication Data

US 2022/0353605 A1 Nov. 3, 2022

(30) Foreign Application Priority Data

Sep. 17, 2019 (JP) ................................ 2019-167908

(51) Int. Cl.

| | |
|---|---|
| ***H04R 1/24*** | (2006.01) |
| ***H04R 7/12*** | (2006.01) |
| ***H04R 7/16*** | (2006.01) |
| ***H04R 9/04*** | (2006.01) |
| ***H04R 9/06*** | (2006.01) |

(52) U.S. Cl.

CPC ................ *H04R 1/24* (2013.01); *H04R 7/12* (2013.01); *H04R 7/16* (2013.01); *H04R 9/045* (2013.01); *H04R 9/06* (2013.01)

(58) Field of Classification Search

CPC ... H04R 7/12; H04R 7/16; H04R 1/24; H04R 9/06; H04R 9/045

See application file for complete search history.

(56) References Cited

FOREIGN PATENT DOCUMENTS

| | | | |
|---|---|---|---|
| JP | 2006-303777 A | | 11/2006 |
| JP | 2006303777 A | * | 11/2006 |

(Continued)

*Primary Examiner* — Sunita Joshi

(74) *Attorney, Agent, or Firm* — Dilworth & Barrese, LLP

(57) ABSTRACT

[Problem] To provide a higher performance and higher quality curved diaphragm speaker system that has sufficient performance for hard-of-hearing people and also for hearing people.

[Solution] A speaker unit 10 according to the present invention at least includes: a first diaphragm 1 in a cone shape; a blade piece 5 in a plate shape to which a second diaphragm in a sheet shape forming a rounded surface portion that is curved from one end side to the other end side; and a driver unit 3 that drives those cone shaped diaphragm and blade piece together. The blade piece is connected via a center cap attached to a tip end of a voice coil of the driver unit so as to protrude from a small diameter 1*a* side to a large diameter 1*b* side of the first diaphragm. In the first diaphragm, the small diameter side is connected to the driver unit, and also the large diameter side is attached to a cone support frame 9. Additionally, the second diaphragm is arranged such that the one end side is overlapped with one surface of the blade piece.

15 Claims, 13 Drawing Sheets

(56) References Cited

FOREIGN PATENT DOCUMENTS

| | | | | | |
|---|---|---|---|---|---|
| JP | 5668233 | B1 | | 2/2015 | |
| JP | 2015-233272 | A | | 12/2015 | |
| JP | 2015233272 | A | * | 12/2015 | ............... H04R 1/24 |
| JP | 2016-140060 | A | | 8/2016 | |
| JP | 2019-201259 | A | | 11/2019 | |
| WO | 2015-146446 | A1 | | 10/2015 | |

* cited by examiner

Ｆｉｇ．６
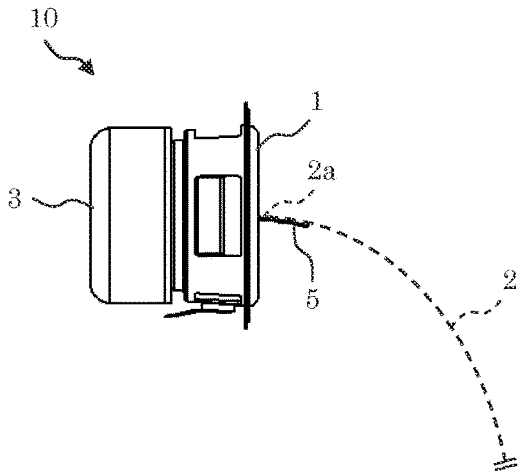
Ｆｉｇ．７
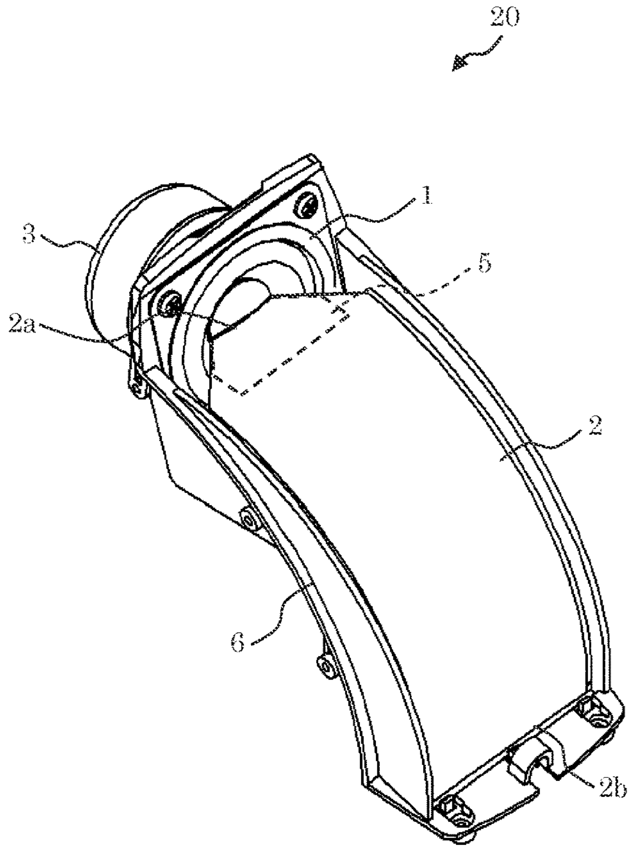

Ｆｉｇ．１６
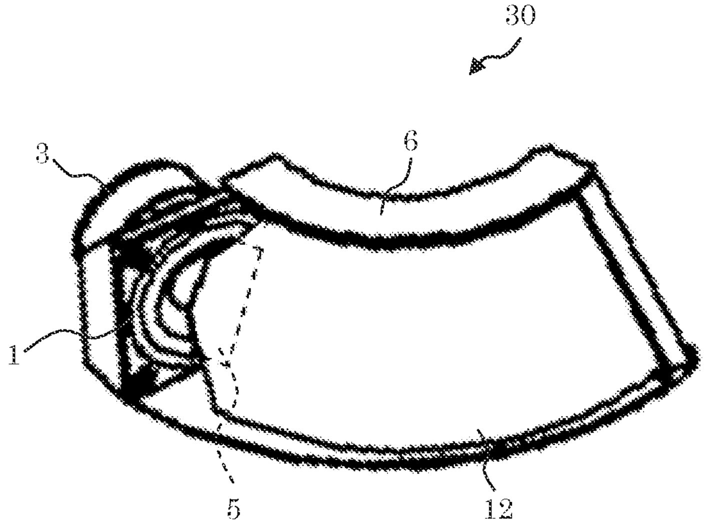
Ｆｉｇ．１７
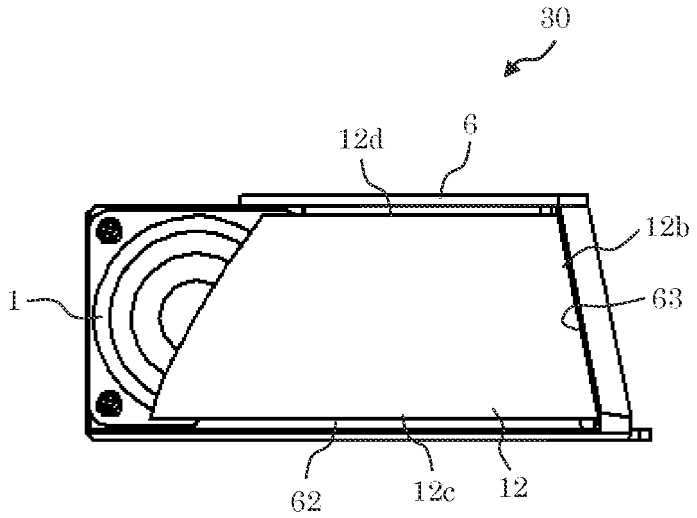

Ｆｉｇ．２０
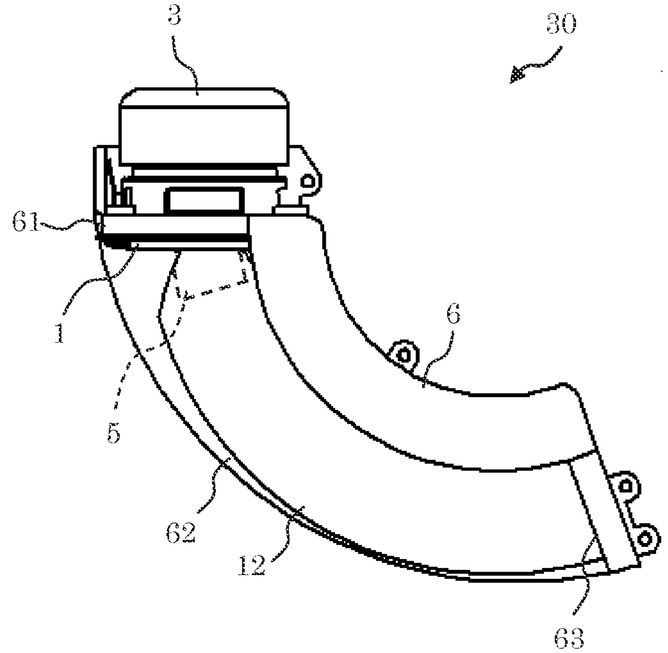
Ｆｉｇ．２１
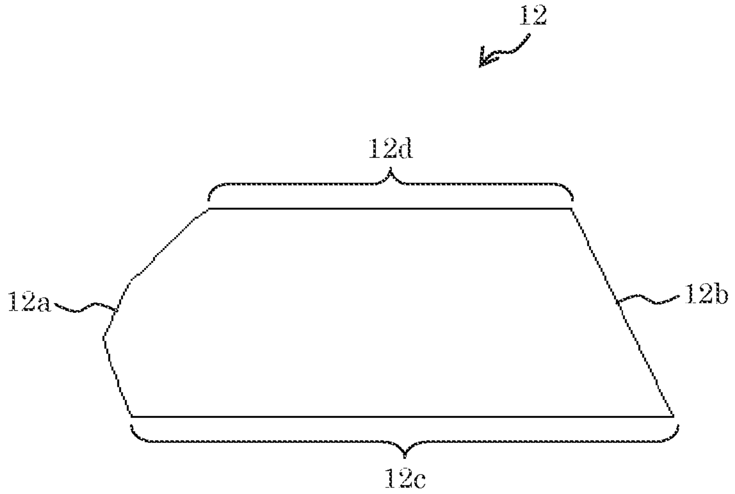

SPEAKER UNIT AND SPEAKER

TECHNICAL FIELD

The present invention relates to a speaker unit using a curved diaphragm and a speaker using the speaker unit, and specifically, relates to a higher-performance compound type curved diaphragm speaker system that allows hard-of-hearing people to hear together with hearing people without using a hearing aid and that also expands a reproduction frequency band.

BACKGROUND ART

Recent years, the number of people with hearing difficulties such as age-related hearing loss caused by aging, organic hearing loss with a damage to the external ear, the middle ear, the internal ear, the cochlear nerve, and the like, and functional hearing loss caused by stress has been increased, and the number of hard-of-hearing people in the country is said to be 20 million. In a case of hearing loss, it is not only a loss of a sense of hearing but also it is difficult to distinguish clearly even the sounds that can hear. For this reason, in some cases, misunderstanding may give to a conversation partner by answering even without understanding the content of the conversation well, or a lively conversation cannot be made because of repeatedly asking of what is said.

Additionally, it has been said that there is a risk that an inability to communicate smoothly due to the hearing loss may cause a phenomenon where it becomes troublesome unconsciously to have a conversation, which leads less opportunities to meet with people and a tendency to stay at home, and there may occur a problem of social isolation and exclusion.

In general, use of a hearing aid is a means of reducing the inconveniences of the hearing loss as described above. Additionally, for a case of watching a television, there is an FM transmitter that obtains the sound of the television by being connected to an earphone jack of the television to transmit the sound via FM radio waves and receive the FM radio waves with the own FM radio.

However, the hearing aid has not been preferably used and has been used reluctantly in many cases because of the reasons such as "troublesome" and "embarrassing to wear". Additionally, there are many hearing aids that also pick up the noises, which rather causes great stress in some cases.

On the other hand, in a case of using the FM transmitter, it is troublesome there is required to prepare the FM transmitter and install the FM transmitter every time watching a television. Additionally, there is a problem that, since the output destination of the sound is switched by connecting the FM transmitter to the earphone jack, it is impossible for hard-of-hearing people and hearing people to comfortably watch the television together.

To deal with this, as a speaker that generates sound that not all the hard-of-hearing people but most of the hard-of-hearing people can hear, there has been proposed by the applicant a speaker that is provided with a housing with a hollow structure, a driving unit stored in the housing, and a curved diaphragm arranged on a surface of the housing so as to emit the sound by conducting vibrations of the driving unit to an end edge portion of the curved diaphragm (for example, see Patent Literatures 1 and 2).

Such a speaker using a curved diaphragm (hereinafter, simply referred to as a "curved diaphragm speaker") allows hard-of-hearing people to hear without wearing a hearing aid and also allows hearing people to hear without any discomfort.

In addition, with the curved diaphragm speaker according to the inventions disclosed in Patent Literatures 1 and 2, it could be confirmed in a later demonstration experiment that it allows for hearing of close sounds as a matter of course but also for clear hearing of sounds in the distance. That is, it allows for hearing with no cracking sound like when the volume is turned up excessively and also for hearing of close sounds at a volume not excessively loud.

It has been confirmed that this curved diaphragm speaker has a basic performance at an applicable level and is at a manufacturable level; however, it has been demanded in the expansion of a reproduction frequency band, in particular a low sound band equal to or less than 400 to 500 Hz (hereinafter, referred to as a "low frequency"), to enhance the sound quality by improving the reproduction performance.

Here, the curved diaphragm speaker is in general a means that drives a curved diaphragm by a moving coil, that is, a voice coil, and generates sound. In order to increase the reproduction capability on the low frequency side in this means, there is required an increase in the amount of voice coil amplitude (movement) appropriate for the capability, an appropriate diaphragm and structure, and powerup.

However, if the amount of the amplitude of the voice coil is increased forcibly to increase the reproduction capability on the low frequency side, the curved diaphragm itself makes abnormal sound. For this reason, in order to perform the low frequency reproduction equivalent to that by a conventional type speaker, the area of the curved diaphragm needs to be expanded by, for example, extending the length, but the dimension is no longer an applicative dimension.

To deal with this, it can be considered in order to increase the reproduction capability on the low frequency side that a dynamic type speaker unit including a cone shaped diaphragm is further mounted in a housing in which a curved diaphragm speaker unit is mounted, and both the speaker units are driven to emit sounds respectively. With this, the sound quality of the curved diaphragm with which it is difficult to sound on the low frequency side by the sound emission can be corrected by the cone shaped diaphragm, and there can be implemented a compound type full-range speaker using the curved diaphragm and the cone shaped diaphragm.

However, in such a compound type speaker system, although the housing in which the speaker units are mounted can be shared, there are still required the two speaker units (the curved diaphragm speaker unit and the dynamic type speaker unit) corresponding to the reproduction frequency bands, and this leads high cost.

Additionally, if each of the speaker units are mounted in the housing to make the sound emission directions of the curved diaphragm and the cone shaped diaphragm the same in order to secure a favorable sense of sound pressure of the sound emitted from the two speakers, a greater disposing area is required, and the size of the housing is increased. On the other hand, if the sound emission directions of the curved diaphragm and the cone shaped diaphragm are made different in consideration of the disposing area, it is impossible to obtain a sufficient sense of sound pressure in either of the speakers.

PRIOR ART DOCUMENTS

Patent Documents

Patent Documents 1: Japanese Patent No. 5668233
Patent Documents 2: Japanese Patent Application Publication No. 2016-140060

SUMMARY OF INVENTION

Technical Problems

Given the circumstances, the inventor of the present application has proposed in Japanese Patent Application No. 2018-093395 a speaker unit at least including: a first diaphragm in a cone shape; a second diaphragm in a sheet shape that includes a single rounded surface portion that is curved; and a driver unit that drives those first diaphragm and second diaphragm together, in which the driver unit is connected together to a small diameter side of the first diaphragm and one end side of the second diaphragm, and a speaker using this speaker unit.

Since there is required only one driver unit, the manufacturing cost and the weight of this speaker unit are reduced, and also the speaker unit is manufactured small in a compact form. Additionally, the speaker using this speaker unit is a hybrid type speaker system in which a dynamic type first speaker including the cone shaped diaphragm and a second speaker including the curved diaphragm are combined with each other. Therefore, a reproduction band on a low frequency side that the second speaker (curved diaphragm speaker) cannot sound can be made up by the first speaker (dynamic type speaker).

Accordingly, the speaker unit and the speaker proposed in Japanese Patent Application No. 2018-093395 can be a speaker system that is capable of reproducing the sound of a wider band and is quite effective for hard-of-hearing people.

However, in the conventional speaker unit, when the one end side of the second diaphragm (curved diaphragm) is connected to the driver unit, a notch is provided in a tip end of a voice coil and the center of a center cap (dust cap), and the one end side of the second diaphragm (curved diaphragm) is inserted into this notch. For this reason, the connection operation is a little bothersome and complicated and is inefficient for mass production; therefore, there has been demanded an improvement to connect the driver unit and the second diaphragm more efficiently and simply.

The present invention is made in view of the above circumstances and provides a speaker unit, which is able to be manufactured efficiently and simply, and a speaker using this speaker unit, in a compound type speaker system using a curved diaphragm in which the sound quality is enhanced by an expansion of a reproduction frequency band, the cost is reduced, and additionally a favorable sense of sound pressure is secured with no increase in size of a housing.

Solution to Problems

A first speaker unit according to the present invention at least includes: a first diaphragm in a cone shape; a blade piece in a plate shape to which one end side of a second diaphragm is attached, the second diaphragm being in a sheet shape forming a rounded surface portion that is curved from the one end side to another end side; and a driver unit that drives the first diaphragm and the blade piece together, in which, in the first diaphragm, a small diameter side is connected to the driver unit, and the blade piece is connected to the driver unit via a center cap attached to a tip end of a voice coil of the driver unit so as to protrude from the small diameter side to a large diameter side of the first diaphragm.

A second speaker unit according to the present invention at least includes: a first diaphragm in a cone shape; a second diaphragm in a sheet shape forming a rounded surface portion that is curved from one end side to another end side; a blade piece in a plate shape to which the one end side of the second diaphragm is attached; a driver unit that drives the first diaphragm and also drives the second diaphragm via the blade piece; and a support member on which the first diaphragm, the second diaphragm, and the driver unit are mounted, in which the support member includes: a support plate in a flat plate shape including an opening of a size from which a large diameter side of the first diaphragm is exposed; a support surface that is continuously provided on the support plate and includes a rounded surface portion that is equivalent to the curve of the second diaphragm; a fixing unit that is continuously provided at a terminating end portion of the support surface to attach the other end side of the second diaphragm thereto; and a flexible elastic support member that is arranged on the support surface, and in the first diaphragm, a small diameter side is connected to the driver unit, and also the large diameter side is connected to the support plate of the support member, the blade piece is connected to the driver unit via a center cap attached to a tip end of a voice coil of the driver unit so as to protrude from the small diameter side to the large diameter side of the first diaphragm, and in the second diaphragm, the one end side is connected to the blade piece, and also the other end side is connected to the fixing unit of the support member, and additionally the elastic support member intervenes between a depression surface side of the rounded surface portion and the support surface of the support member.

In the above-described first speaker unit and second speaker unit, in the blade piece, it is desirable that a base end side is perpendicular to the center cap and is curved in accordance with the curvature of the second diaphragm as being closer to a tip end side. That is, if the blade piece is attached so as to protrude at a right angle all over from the base end side to the tip end side with respect to the center cap attached to the tip end of the voice coil of the driver unit, there is a risk that a tip end of the blade piece strongly hits one surface of the second diaphragm and applies a stress to the second diaphragm which interferes with smooth driving. However, if the base end side of the blade piece is perpendicular to the center cap and is curved in accordance with the curvature of the second diaphragm as being closer to the tip end side, there is no risk of applying a stress to the second diaphragm, and smooth driving can be achieved by efficiently transmitting the vibration of the voice coil to the second diaphragm.

This blade piece may be a separate body from the center cap, but it is desirable to be integral with the center cap. That is, although the blade piece may be attached to an already-existing center cap, two operations, which are attaching the center cap to the voice coil tip end and attaching the blade piece to the center cap, are required in this case; however, if the blade piece and the center cap are integral with each other in advance, the blade piece can be efficiently attached by one operation, which is attaching the center cap to the voice coil tip end. Furthermore, with the blade piece and the center cap being integral with each other, a risk that the blade piece falls away from the center cap due to the vibration of the voice coil can also be avoided.

Moreover, in the above-described second speaker unit, it is desirable that any second diaphragm is formed of a foamed sheet material. That is, if the thickness of the second diaphragm is made excessively thin in order to reduce the weight, the second diaphragm cannot have an appropriate resilience and cannot be vibrated efficiently. On the other hand, if the thickness of the second diaphragm is made excessively thick in order to give the second diaphragm an appropriate resilience, the weight of the second diaphragm is excessively heavy, and naturally efficient vibration cannot be achieved. However, if the second diaphragm is formed of a foamed sheet material, even if the thickness of the second diaphragm is increased, the weight is not profusely increased since there is a hollow, and thus the second diaphragm can have an appropriate resilience and can be vibrated efficiently.

Furthermore, in the above-described second speaker unit, the second diaphragm can have a shape in which the lengths of opposing two side edge portions along a curving direction are longer than the lengths of the one end side and the other end side that is, for example, a substantially elongated rectangular shape. With this, the second diaphragm is easily curved from the one end side to the other end side, and the second diaphragm can be efficiently and easily vibrated.

Additionally, in the above-described second speaker unit, the second diaphragm can have a shape in which the lengths of opposing two side edge portions along a curving direction are longer than the lengths of the one end side and the other end side while the lengths of the two side edge portions are different from each other that is, for example, a substantially elongated trapezoidal shape or a substantially elongated fan shape in which a protrusion surface of the rounded surface portion is oriented to the short side edge portion. With this, sounds emitted from the second diaphragm can be emitted toward a predetermined direction, specifically, a direction in which the protrusion surface of the rounded surface portion faces.

In this case, if the blade piece is attached obliquely with respect to a horizontal direction or a vertical direction in advance, the protrusion surface of the rounded surface portion of the second diaphragm can be oriented to the short side edge portion without rotating the first diaphragm in a circumferential direction.

Moreover, in the above-described second speaker unit, as long as the elastic support member is flexible with elasticity and is a member that can support the second diaphragm, it is not particularly limited, and, for example, the elastic support member can be formed of a flocculent member in which threadlike fibers are entangled.

This elastic support member is not limited to be entirely arranged on the support surface, that is, on the back surface side of the second diaphragm, and can be partially arranged on the support surface. A means to partially arrange the elastic support member may include, for example, linear arrangement along the curving direction of the support surface of a single elastic support member in the center portion or multiple elastic support members away from each other, and scattered arrangement on the support surface.

Furthermore, the speaker according to the present invention is formed by mounting any one of the above-described first speaker unit and second speaker unit into a housing.

Advantageous Effects of Invention

In the first speaker unit and the second speaker unit of the present invention, the blade piece in a plate shape, which is capable of attaching the one end side of the second diaphragm to the center cap attached to the tip end of the voice coil of the driver unit that drives the first diaphragm, is provided in advance. Therefore, without the need for a bothersome and complicated operation such as providing a notch in the tip end of the voice coil and the center of the center cap (dust cap) and inserting the one end side of the second diaphragm (curved diaphragm) into this notch, the driver unit and the second diaphragm can be connected efficiently and simply with each other only by connecting the one end side of the second diaphragm to the blade piece.

Furthermore, since the small diameter side of the first diaphragm and the one end side of the second diaphragm are connected to the same driver unit, the driver unit that drives the first diaphragm and the driver unit that drives the second diaphragm are common and only a single drive unit is required, reduction of the manufacturing cost and reduction of the weight are achieved, and also the disposing area is less and a compact form is achieved.

Additionally, in the speaker of the present invention, with the above-described first speaker unit and second speaker unit of the present invention being mounted (stored) in the housing, a hybrid type speaker system in which a dynamic type first speaker including the cone shaped diaphragm and a second speaker including the curved diaphragm are combined with each other is obtained, and with the first speaker (dynamic type speaker) making up a reproduction band on the low frequency side that the second speaker (curved diaphragm speaker) cannot sound, it is possible to reproduce the sound of a wider band and to obtain a speaker system including a speaker that is quite effective for hard-of-hearing people and a speaker that is for hearing people.

Therefore, in a compound type speaker system using a curved diaphragm, the sound quality is enhanced by an expansion of a reproduction frequency band and also the cost is reduced, and additionally, in the compound type speaker system using the curved diaphragm in which a favorable sense of sound pressure is secured with no increase in size of a housing, a speaker unit that can be manufactured efficiently and simply and a speaker using this speaker unit can be provided.

BRIEF DESCRIPTION OF DRAWINGS

FIG. 6 is a side view describing a blade attaching the second diaphragm to the first speaker unit according to the present invention.

FIG. 7 is a front perspective view illustrating a second speaker unit according to the present invention.

FIG. 16 is a front perspective view illustrating a third speaker unit according to the present invention.

FIG. 17 is a front view illustrating the third speaker unit according to the present invention.

FIG. 20 is a plan view illustrating the third speaker unit according to the present invention.

FIG. 21 is a front view illustrating a second diaphragm (curved diaphragm) used in the third speaker unit according to the present invention.

DESCRIPTION OF EMBODIMENT

Hereinafter, a speaker unit according to the present invention and an example of an embodiment of a hybrid type speaker system using this speaker unit is described with reference to the drawings.

Since the embodiment described below is a preferable specific example of the present invention, there are included various technical limitations; however, the scope of the present invention is not limited to those modes unless the limitation is stated otherwise in the descriptions below.

Figure 1:
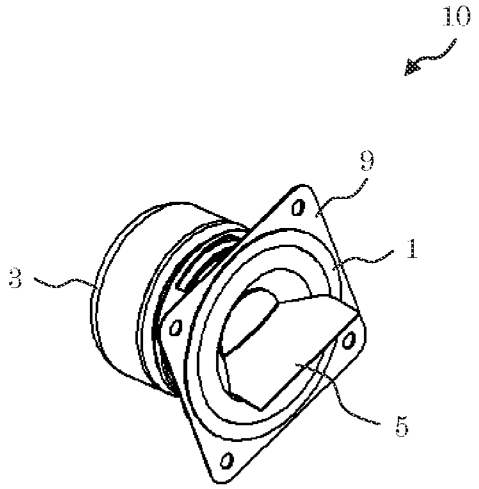
FIG. 1 is a front perspective view illustrating a first speaker unit according to the present invention.
Figure 2:
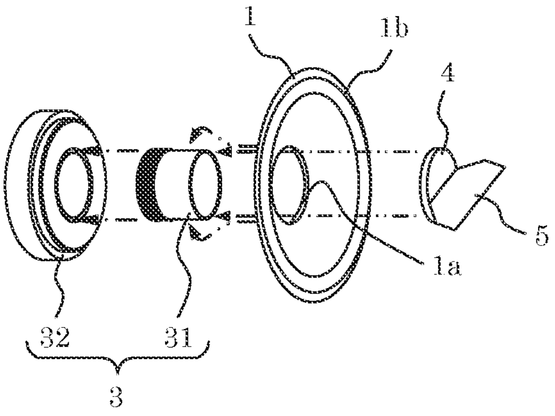
FIG. 2 is an exploded view describing a structure of the first speaker unit according to the present invention.

As illustrated in FIG. 1 and FIG. 2, a first speaker unit 10 according to the present embodiment at least includes a first diaphragm 1 in a cone shape (hereinafter, referred to as a “cone shaped diaphragm”), a blade piece 5 in a plate shape to which one end side of a second diaphragm 2 is attached, the second diaphragm 2 being in a sheet shape forming a rounded surface portion that is curved from one end side to the other end side (hereinafter, referred to as a “curved diaphragm”), and a driver unit 3 that drives those cone shaped diaphragm and the blade piece 5 together.

The cone shaped diaphragm 1 is a sheet shaped member in a mortar shape, in which a small diameter side 1*a* is connected to the driver unit 3 while a large diameter side 1*b* is attached to a cone support frame 9.

This cone shaped diaphragm 1 forms a speaker with the cone support frame 9 being attached to a support member 6 described later and additionally the support member 6 being mounted in a housing 50 or the cone support frame 9 being directly mounted in the housing 50.

The blade piece 5 is integral with a center cap 4 attached to a tip end of a voice coil 31 of the driver unit 3 so as to protrude from the small diameter 1*a* side to the large diameter 1*b* side of the cone shaped diaphragm 1 and is connected to the driver unit 3.

The center cap (dust cap) 4 is a member attached to prevent dust from entering into the voice coil 31, and it is possible to enhance the sense of unity in the tone by using the same material as that of the cone paper, or it is possible to give a role of a dome type tweeter by using a metallic material.

The driver unit 3 is an actuator that vibrates the cone diaphragm 1 and the blade piece 5 together in accordance with an electric signal (a sound signal) inputted (electrically conducted).

The driver unit 3 may include an electromagnetic actuator of a moving coil type or a moving magnet type, for example. These driver units 3 have a high magnetic efficiency since the coil has a high occupancy. Therefore, clear sound emission with high volume can be expected.

The moving coil type actuator, in which a voice coil is inserted and arranged in a magnetic gap formed by the magnetic circuit, transmits vibrations and drives a diaphragm connected with the voice coil by applying an electric signal and the like to this voice coil and generating vibrations according to the applied signal. That is, one end of the voice coil is stored within the magnetic circuit (a magnetic field), and the other end is connected to the diaphragm; thus, the inputted electric signal moves the voice coil, and the movement is transmitted to the diaphragm and converted into sound energy (sound).

In the present embodiment, the driver unit 3 is described as a moving coil type actuator that drives a voice coil by applying an electric signal with one end of the voice coil inserted into a magnetic gap of a magnetic circuit.

Figure 3:
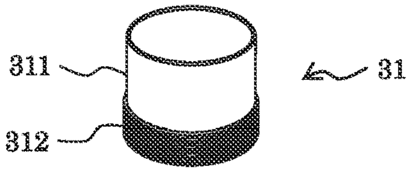
FIG. 3 is a front perspective view describing a voice coil included in a driver unit used in a speaker unit according to the present invention.

As illustrated in FIG. 3, the voice coil 31 is formed by winding a coil wire rod 312 of a desired diameter by the desired number of turns around an outer periphery end portion of a coil bobbin 311 in a cylindrical shape.

Figure 4A:
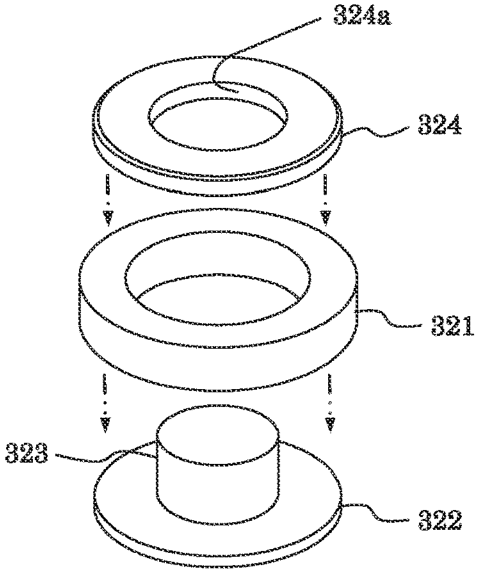
FIG. 4(A) is an exploded perspective view and FIG. 4(B) is an assembled completion perspective view describing a magnetic circuit included in the driver unit used in the speaker unit according to the present invention.
Figure 4B:
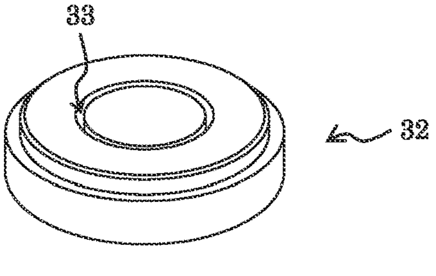

On the other hand, as illustrated in FIG. 4, the magnetic circuit 32 has a shape appropriate for driving the voice coil 31, and a common structure most frequently used includes magnetic circuit parts such as a ferrite magnet 321 in a ring shape, a plate 324 in which a hole 324*a* with a diameter of a predetermined dimension is provided in a center portion of a circle plate made of iron material that is an excellent magnetic material, and a yoke 322 in which a protrusion portion (hereinafter, described as a “pole”) 323 in a column shape is provided similarly in a center portion of a circle plate made of iron material.

The magnetic gap is formed with the plate 324 arranged and mounted on an upper surface of the ferrite magnet 321 in a cylindrical shape and also with the circle plate portion of the yoke 322 including the pole 323 in a column shape arranged and mounted on a lower surface of the ferrite magnet 321. That is, the pole 323 and the plate 324 are mounted such that cores of an outer diameter of the pole 323 and an inner diameter of the plate hole 324*a* are aligned with each other, and thus a ring shaped clearance, or a gap 33, having a predetermined width dimension is formed between an outer surface of the pole 323 and an inner surface of the hole 324*a* in the plate 324 center portion.

Additionally, the dimension in a depth direction of the magnetic gap 33 is determined based on the thickness dimension of the plate 324. Therefore, magnetism that the ferrite magnet 321 has is conducted and converged into the gap 33 by the yoke 322 and the plate 324, a magnetic flux is generated in the gap 33, and thus the magnetic gap is formed. Then, the voice coil 31 is arranged in the center of this ring shaped magnetic gap 33.

Therefore, as illustrated in FIG. 2, the cone shaped diaphragm 1 is connected and fixed to the driver unit 3 by inserting the voice coil 31 into a hole (hereinafter, described as a "neck portion") of a predetermined dimension provided in a center portion on the small diameter 1*a* side and applying an adhesive to a contact portion between the neck portion and an outer periphery portion of the coil bobbin 311.

In the speaker unit 10 in the present embodiment, in a case of connecting a one end 2*a* side of the curved diaphragm 2 to the driver unit 3, the curved diaphragm 2 and the driver unit 3 (the voice coil 31) can be connected with each other by attaching to the blade piece 5 integral with the center cap 4 attached to the tip end of the voice coil 31.

Figure 5A:
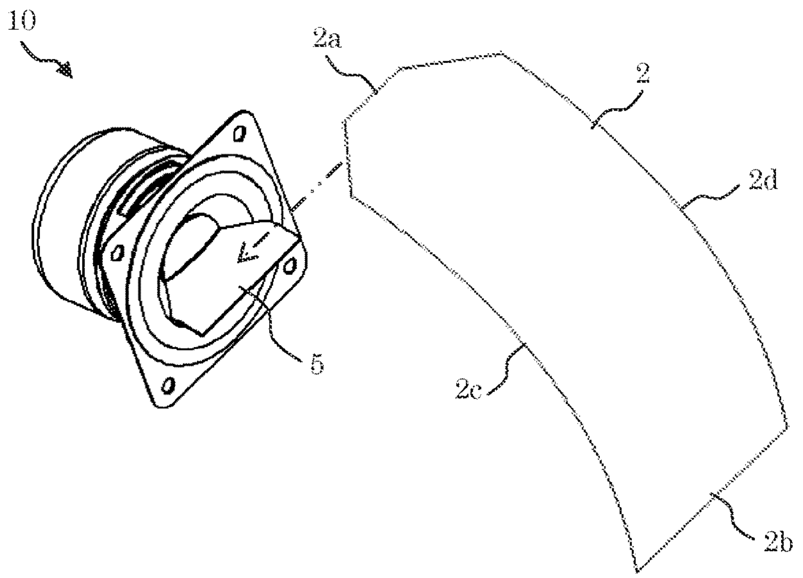
FIG. 5(A) is a front perspective view before attaching and FIG. 5(B) is a front perspective view after attaching that illustrates states of attaching a second diaphragm to the first speaker unit according to the present invention.
Figure 5B:
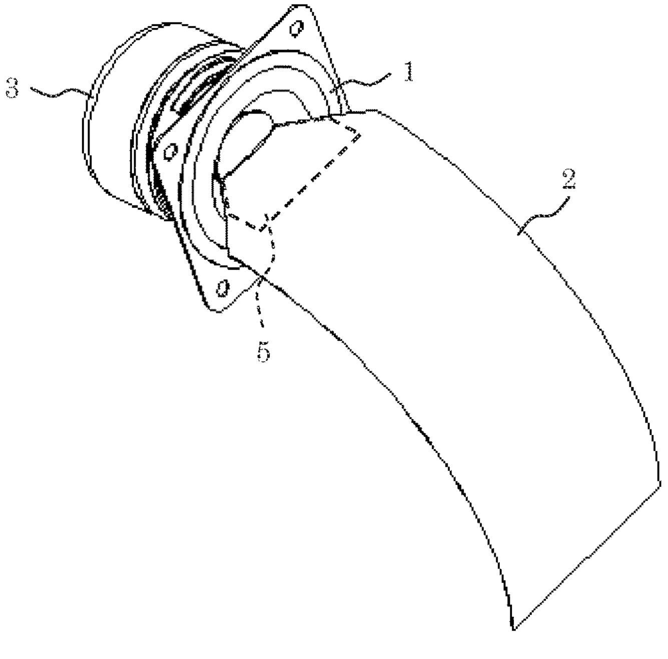
Figure 8:
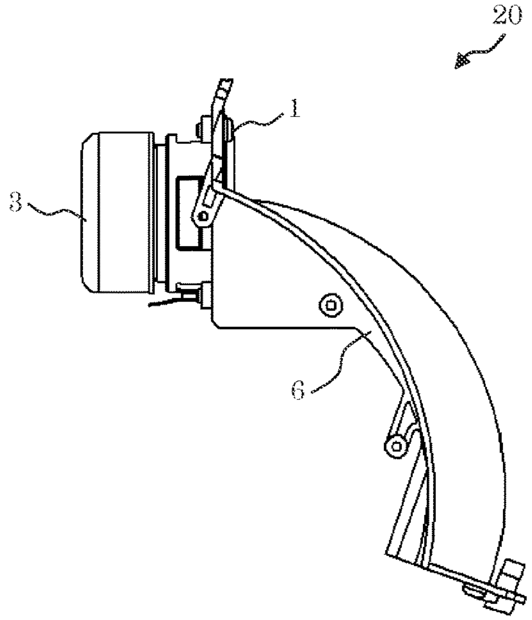
FIG. 8 is a left side view illustrating the second speaker unit according to the present invention.
Figure 9:
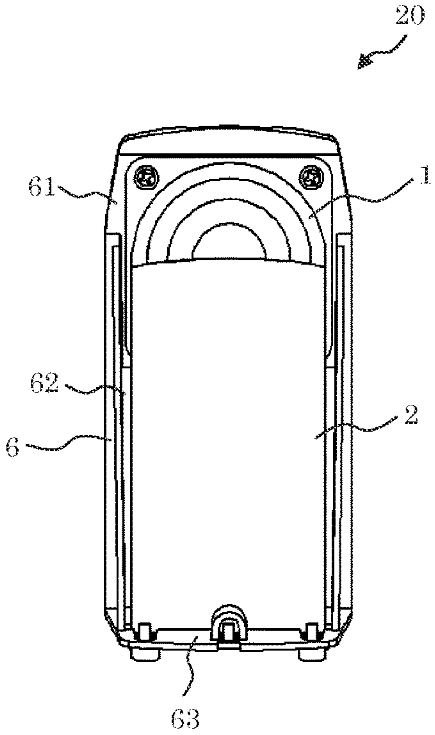
FIG. 9 is a front view illustrating the second speaker unit according to the present invention.
Figure 10:
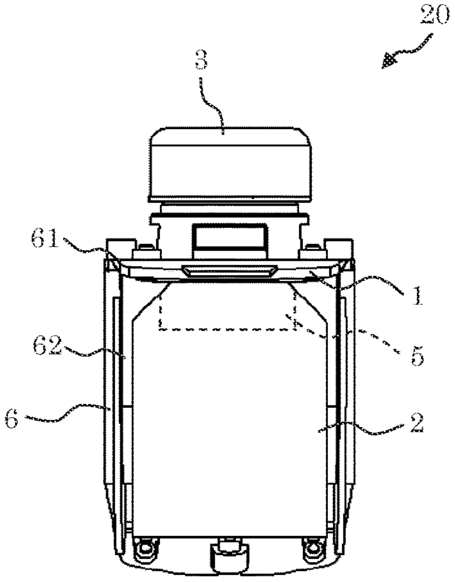
FIG. 10 is a plan view illustrating the second speaker unit according to the present invention.

That is, as illustrated in FIG. 5(A), after an adhesive is applied to one surface side of the blade piece 5 or to one surface side of the curved diaphragm 2, as indicated by a dashed-two dotted line arrow in FIG. 5(A), the one surface on the one end 2*a* side of the curved diaphragm 2 is arranged to be overlapped with the one surface of the blade piece 5; thus, a speaker unit as illustrated in FIG. 5(B) can be obtained.

This means can reliably connect the curved diaphragm 2 and the driver unit 3 (the voice coil 31) with each other as compared to the conventional means in which a notch is provided in the tip end of the voice coil 31 and the one end side 2*a* of the curved diaphragm 2 is inserted into the notch.

Additionally, in this blade piece 5, it is desirable that a base end side is perpendicular to the center cap and is curved in accordance with the curvature of the second diaphragm as being closer to the tip end side. In other words, an operation of forming a rounded surface portion by elastically warping and deforming the curved diaphragm 2 and an attaching operation of the curved diaphragm 2 to the blade piece 5 are easily performed if the blade piece is curved along with the curvature of the second diaphragm as being closer to the tip end side, and additionally, during the driving by the driver unit 3, the second diaphragm 2 can be driven smoothly with no risk of applying a stress thereto.

In FIG. 6, the blade piece 5 is illustrated as being curved along with the curvature of the second diaphragm as being closer to the tip end side.

In the speaker unit 10 formed as described above, the small diameter side 1*a* of the cone diaphragm 1 and the one end side 2*a* end surface of the curved diaphragm 2 attached via the blade piece 5 are connected together to the driver unit 3 (the voice coil 31). Therefore, with an electric signal and the like being applied to the driver unit 3, the voice coil 31 generates vibration in accordance with the applied signal, and the cone diaphragm 1 and the curved diaphragm 2 connected to this voice coil 31 can be driven together by transmitting the vibration thereto.

That is, one end (base end portion) of the voice coil 31 is stored within a magnetic circuit (magnetic field) 32, and the other end (tip end portion) is connected to the curved diaphragm 2 via the cone diaphragm 1 and the blade piece 5; thus, the inputted electric signal moves the voice coil 31, and the movement is transmitted to the cone diaphragm 1 and the curved diaphragm 2 and converted into sound energy (sound).

In this case, a direction in which the curved diaphragm 2 is driven by the driver unit 3 is an expanding direction on a surface of the curved diaphragm 2, that is, a curving direction in which the rounded surface portion is expanded as being closer from the one end side 2*a* to the opposing other end side 2*b* (or from the other end side 2*b* to the opposing one end side 2*a*) of the curved diaphragm 2.

Therefore, since the curved diaphragm 2 with the driver unit 3 and blade piece 5 can be connected simply and reliably in the first speaker unit 10 in the present embodiment, efficient mass production can be achieved.

Additionally, after the curved diaphragm 2 is attached to the blade piece 5 of the first speaker unit 10, a second speaker unit 20 as illustrated in FIG. 7 can be obtained by mounting the first speaker unit 10 to the support member 6 described later. Moreover, this first speaker unit 10 can also be a speaker by mounting the cone support frame 9 into a housing and also fixing the other end 2*b* side of the curved diaphragm 2 to the housing.

Next, the second speaker unit 20 formed by using the above-described first speaker unit 10 is described.

Note that, in the following embodiment, portions different from the above-described first speaker unit 10 are mainly described. Therefore, a constituent similar to that of the first speaker unit 10 is assigned with the same reference sign while the description is omitted, and the constituents are assumed to be the same unless stated otherwise.

As illustrated in FIG. 7 to FIG. 14, the second speaker unit 20 according to the present embodiment at least includes the first diaphragm 1 in a cone shape (cone shaped diaphragm), the second diaphragm 2 in a sheet shape that is curved from the one end side to the other end side (curved diaphragm), the blade piece 5 in a plate shape to which the one end side of the curved diaphragm 2 is attached, the driver unit 3 that drives the cone shaped diaphragm 1 and also drives the curved diaphragm 2 via the blade piece 5, and the support member 6 on which those cone shaped diaphragm 1, curved diaphragm 2, and driver unit 3 are mounted.

In the speaker unit 20 according to the present embodiment, the curved diaphragm 2 is a sheet shaped member having a flexibility capable of forming the rounded surface portion that is curved, and the one end side 2*a* is connected via the center cap 4 and the blade piece 5 to the driver unit 3 to which the small diameter side 1*a* of the cone shaped diaphragm 1 is connected.

This curved diaphragm 2 forms the rounded surface by elastically warping and deforming the other end side 2*b* after the one end side 2*a* is connected to the blade piece 5 while being in an upright flat plate state, and connects the other end side 2*b* to a fixing unit 63 described later of the support member 6 with the deformed curved protrusion surface side facing the front. Additionally, the curved diaphragm 2 may be a member formed in advance to include the rounded surface portion that is curved, and in this case, after the one end side 2*a* is connected to the blade piece 5, the curved diaphragm 2 is arranged such that the curved protrusion surface faces the front, and the other end side 2*b* is connected to the fixing unit 63 described later of the support member 6.

Moreover, the curved diaphragm 2 is in a substantially elongated rectangular shape in which the lengths of opposing two side edge portions 2*c* and 2*d* along a curving direction from the one end 2*a* side to the other end 2*b* side are longer than the lengths of the one end 2*a* side and the other end 2*b* side, and furthermore, the curved diaphragm 2 has a shape in which the distance (width) between the two side edge portions 2*c* and 2*d* becomes gradually smaller in the middle of being closer to the one end side 2*a* from the other end side 2*b*.

That is, the shapes of the side edge portions close to the one end side 2*a* in the curved diaphragm 2 have substantially the same shape conforming to the mortar shape of the cone shaped diaphragm 1, and even when the one end side 2*a* of the curved diaphragm 2 is connected to the driver unit 3 to which the cone shaped diaphragm 1 is connected, the curved diaphragm 2 is never put into contact with the cone shaped diaphragm 1, and the cone shaped diaphragm 1 and the curved diaphragm 2 do not interfere with each other.

Additionally, although it is not illustrated, the curved diaphragm 2 may include a constricted portion in the side edge portion or a notch portion in a surface.

The constricted portion includes partially a narrow-width region with the side edge portion of the curved diaphragm 2 being notched curvilinearly and smoothly and can have a guitar shape or a snowman shape when the curved diaphragm 2 is viewed from the front, for example.

Moreover, the notch portion includes partially an opening region with the surface being notched to form a single or multiple holes near the center of the curved diaphragm 2, and there can be formed one large circular hole or a pattern with small holes, for example.

That is, with such a constricted portion and a notch portion being provided, the curved diaphragm 2 can restrict distortion due to resonance and can achieve the enhancement of hearing with appropriate harmonics by suppressing excessive resonance.

As a material of this curved diaphragm 2, paper such as carbon paper, plastic having flexibility such as polyimide and polyester, wood such as balsa wood, and metal such as aluminum, beryllium, and boron can be used. Additionally, the thickness of the curved diaphragm 2 is not particularly limited as long as the curved diaphragm 2 can be formed so as to include in advance the rounded surface portion that is curved, or the curved diaphragm 2 can be elastically bent and deformed.

Additionally, as a material of the curved diaphragm 2, for example, a foamed sheet material may be applied. Specifically, a sheet shaped high foam with a thickness of about 1 mm that is called "Softlon S" of SEKISUI CHEMICAL CO., LTD. that foams by heating from ×5 to ×50 after irradiating polyethylene with electron beams can be applied.

Figure 11:
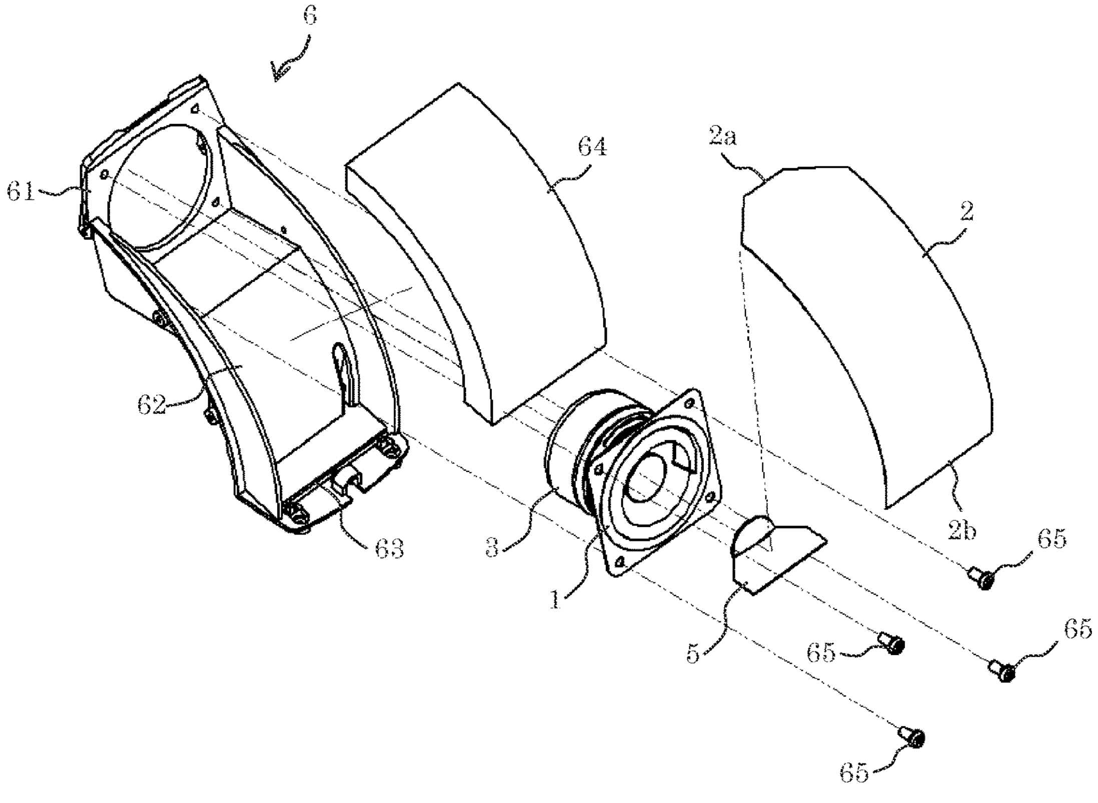
FIG. 11 is an exploded perspective view describing a structure of the second speaker unit according to the present invention.

Moreover, as illustrated in FIG. 11, the support member 6 includes a support plate 61, a support surface 62 continuously provided on this support plate 61, the fixing unit 63 continuously provided at a terminating end portion of this support surface 62, and a flexible elastic support member 64 arranged on the support surface 62. Note that, a reference sign 65 illustrated in FIG. 11 is a screw for attaching and fixing the first speaker unit 10 to the support plate 61 of the support member 6.

The support plate 61 is a part in a flat plate shape including an opening of a size from which the large diameter 1*b* side of the cone shaped diaphragm 1 is exposed, and with the cone support frame 9 to which the large diameter side 1*b* of the cone diaphragm 1 is connected being attached around the opening, the large diameter side 1*b* of the cone diaphragm 1 is connected to the support member 6 by the support plate 61.

The support surface 62 is a part including a rounded surface portion that is equivalent to the curve of the curved diaphragm 2, and on a back surface side of the curved diaphragm 2, the rounded surface portion is positioned so as not to be put in contact with a back surface of the curved diaphragm 2. This support surface 62 functions as an auxiliary to prevent deformation of the curved diaphragm 2 due to external force from a front surface side.

The fixing unit 63 is a part to which the other end 2*b* side of the curved diaphragm 2 is attached and includes a depressed groove on a top surface along a width direction. Therefore, with the other end side 2*b* of the curved diaphragm 2 being attached in this depressed groove, the other end side 2*b* of the curved diaphragm 2 is connected to the support member 6 by the fixing unit 63.

The elastic support member 64 is a member that is flexible with elasticity and can support the curved diaphragm 2 to prevent the flexure, and, for example, the elastic support member 64 can be formed of a sponge or a flocculent member in which threadlike fibers are entangled. That is, with the one end 2*a* side of the curved diaphragm 2 being connected to the blade piece 5 and also the other end 2*b* side being connected to the fixing unit 63 of the support member 6, the elastic support member 64 is arranged so as to intervene between a depression surface side of the rounded surface portion in the curved diaphragm 2 and the support surface 62 of the support member 6.

In FIG. 11, the elastic support member 64 is illustrated as intervening entirely between the depression surface side of the rounded surface portion in the curved diaphragm 2 and the support surface 62 of the support member 6.

Figure 12:
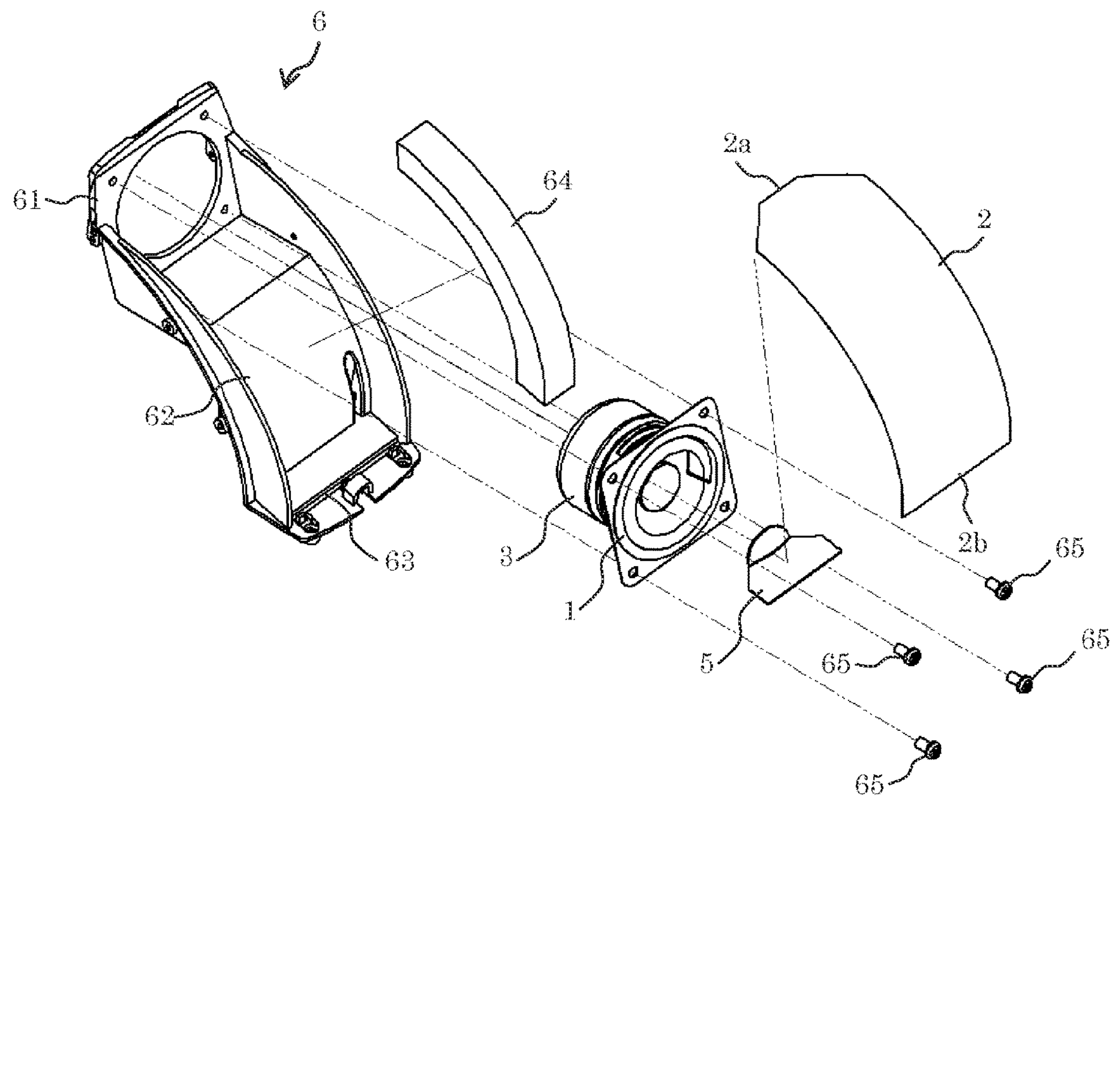
FIG. 12 is an exploded perspective view describing another structure of the second speaker unit according to the present invention.
Figure 13:
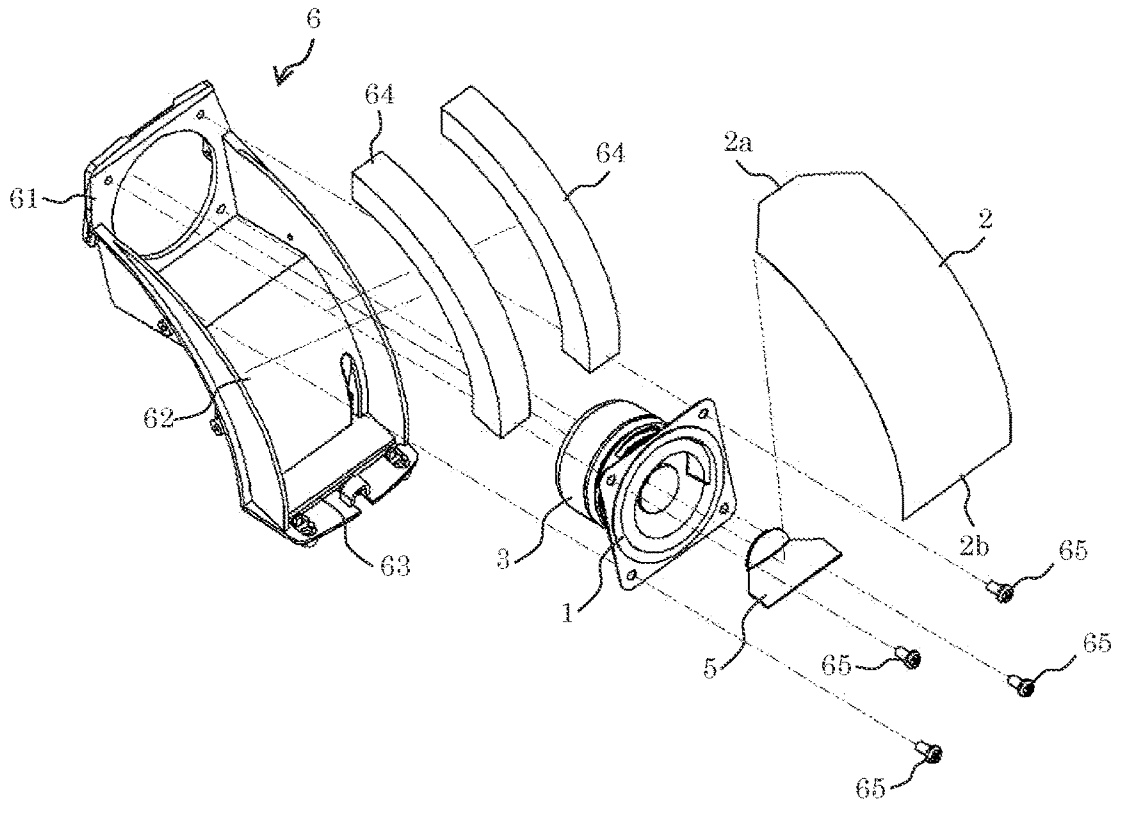
FIG. 13 is an exploded perspective view describing another structure of the second speaker unit according to the present invention.
Figure 14:
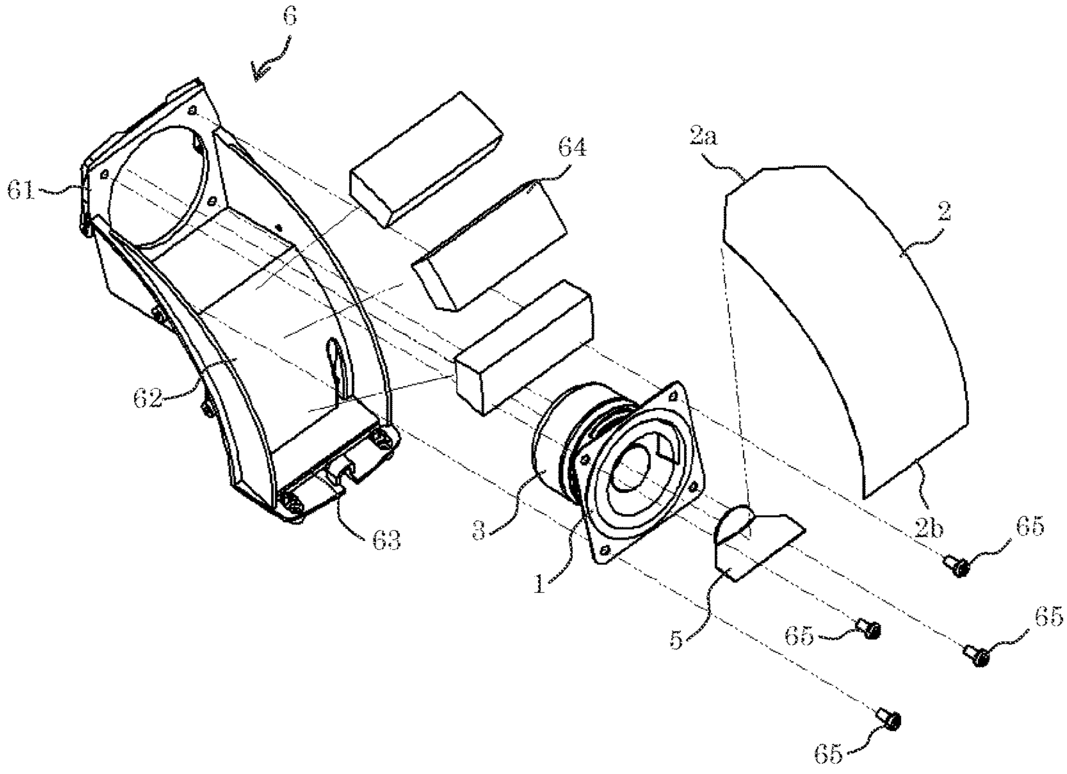
FIG. 14 is an exploded perspective view describing another structure of the second speaker unit according to the present invention.

The elastic support member 64 may not intervenes entirely between the depression surface side of the rounded surface portion in the curved diaphragm 2 and the support surface 62 of the support member 6 as illustrated in FIG. 11 but may intervene partially as illustrated in FIG. 12 to FIG. 14.

As a means to partially arrange the elastic support member 64, for example, FIG. 12 illustrates that a single elongated elastic support member 64 extending along the curving direction of the support surface 62 is arranged in the center portion of the support surface 62. Additionally, FIG. 13 illustrates that two elongated elastic support members 64 extending along the curving direction of the support surface 62 are arranged on the support surface 62 while being away from each other. Moreover, FIG. 14 illustrates that three elastic support members 64 in a block shape extending in a direction orthogonal to the curving direction of the support surface 62 are arranged along the curving direction of the support surface 62 while being away from each other. Note that, although it is not illustrated, elastic support members in a small piece shape may be scattered and arranged on the support surface.

In the speaker unit 20 formed as described above, the small diameter side 1*a* of the cone diaphragm 1 is directly connected to the driver unit 3 (the voice coil 31), also the one end side 2*a* of the curved diaphragm 2 is indirectly connected to the driver unit 3 (the voice coil 31) via the blade piece 5, and additionally the large diameter side 1*b* of the cone diaphragm 1 and the other end side 2*b* of the curved diaphragm 2 are connected to the support member 6 together. Therefore, the cone diaphragm 1, the curved diaphragm 2, and the driver unit 3 are stably supported by the support member 6, and easy conveyance and easy mounting in the housing can be made.

Figure 15:
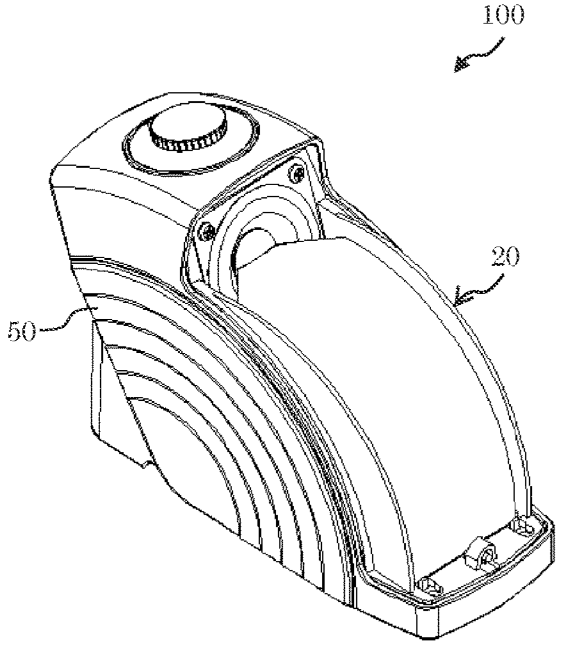
FIG. 15 is a front perspective view illustrating a speaker in which the second speaker unit according to the present invention is mounted in a housing.
Figure 18:
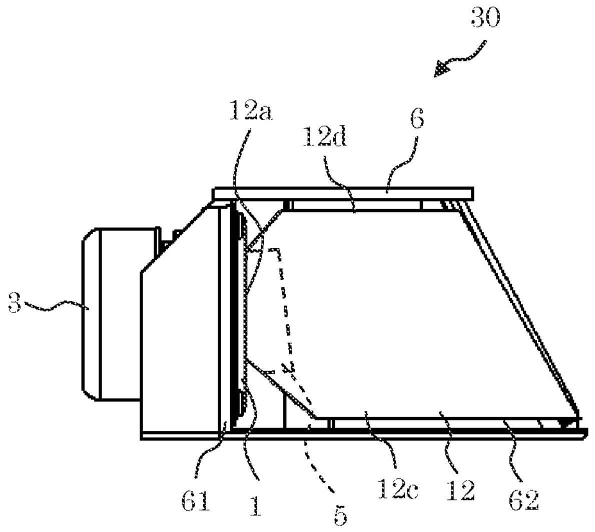
FIG. 18 is a left side view illustrating the third speaker unit according to the present invention.
Figure 19:
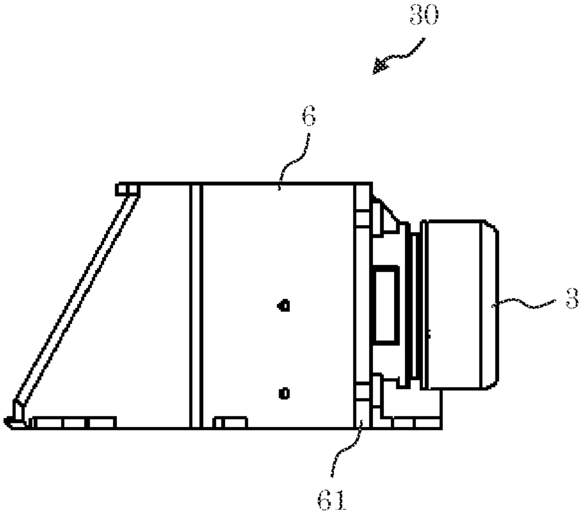
FIG. 19 is a right side view illustrating the third speaker unit according to the present invention.

Additionally, as illustrated in FIG. 15, a speaker 100 according to the present embodiment can be formed by mounting the second speaker unit 20 at least including the cone diaphragm 1, the curved diaphragm 2, the driver unit 3, the blade piece 5, and the support member 6 into the housing 50, for example.

The speaker 100 formed as described above includes a dynamic type first speaker including the cone diaphragm 1 and a second speaker including the curved diaphragm 2, and with the electric signal inputted to the driver unit 3, the speaker 100 can be a hybrid type speaker system that has, comparing with a conventional speaker system for hard-of-hearing people and hearing people, higher performance, and also, lighter weight, less disposing area, and further improved versatility of the speaker, and that allows both the hard-of-hearing people and hearing people to hear sufficiently.

Next, a third speaker unit 30 formed by using the above-described first speaker unit 10 is described.

As illustrated in FIG. 16 to FIG. 22, the third speaker unit 30 according to the present embodiment at least includes the first diaphragm 1 in a cone shape (cone shaped diaphragm), a second diaphragm 12 in a sheet shape curved from one end side to the other end side (curved diaphragm), the blade piece 5 in a plate shape to which a one end 12*a* side of the curved diaphragm 12 is attached, the driver unit 3 that drives the cone shaped diaphragm 1 and also drives the curved diaphragm 12 via the blade piece 5, and the support member 6 on which those cone shaped diaphragm 1, curved diaphragm 12, and driver unit 3 are mounted.

In the speaker unit 30 according to the present embodiment, as illustrated in FIG. 21, in the curved diaphragm 12, the lengths of opposing two side edge portions 12*c* and 12*d* along a curving direction from a one end 12*a* side to the other end 12*b* side are longer than the lengths of the one end 12*a* side and the other end 12*b* side, and also, the lengths of the two side edge portions 12*c* and 12*d* are different from each other, and a protrusion surface of the rounded surface portion is oriented to the side edge portion 12*d* with a short length.

Figure 22:
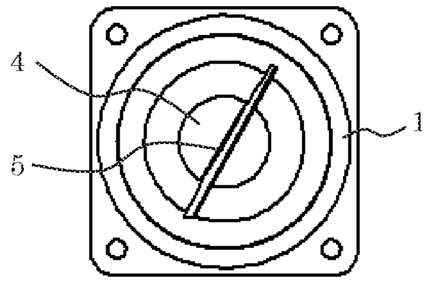
FIG. 22 is a front view describing a blade attaching the second diaphragm in the third speaker unit according to the present invention.

The blade piece 5 protrudes from the small diameter 1*a* side to the large diameter 1*b* side of the cone shaped diaphragm 1, and also, as illustrated in FIG. 22, the blade piece 5 is arranged obliquely in a horizontal direction or obliquely in a vertical direction with respect to the center cap 4 attached to the tip end of the voice coil 31 of the driver unit 3.

Additionally, as with the second speaker unit 20, the support member 6 can be formed by including the support plate 61, the support surface 62 continuously provided on this support plate 61, the fixing unit 63 continuously provided at the terminating end portion of this support surface 62, and a flexible elastic support member (not illustrated) arranged on the support surface 62.

In the speaker unit 30 formed as described above, the small diameter side 1*a* of the cone diaphragm 1 is directly connected to the driver unit 3 (the voice coil 31), also the one end side 12*a* of the curved diaphragm 12 is indirectly connected to the driver unit 3 (the voice coil 31) via the blade piece 5 arranged obliquely with respect to the center cap 4, and additionally the large diameter side 1*b* of the cone diaphragm 1 and the other end side 12*b* of the curved diaphragm 12 are connected to the support member 6 together. Therefore, the protrusion surface of the rounded surface portion of the curved diaphragm 12 is oriented to the short side edge portion 12*d*.

Figure 23:
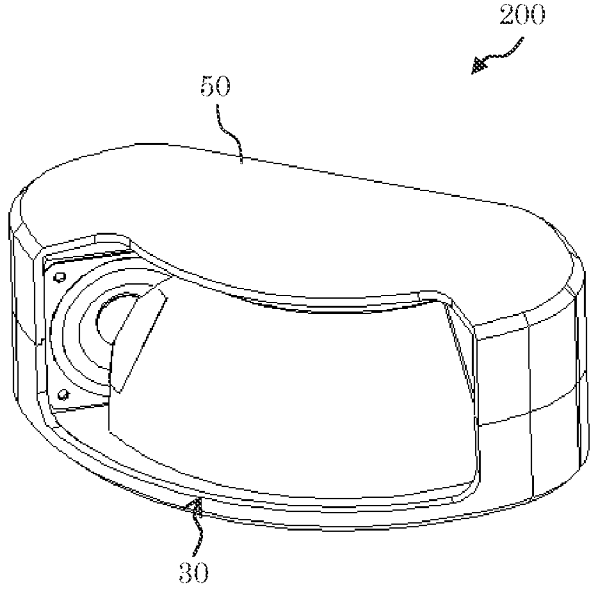
FIG. 23 is a front perspective view illustrating a speaker in which the third speaker unit according to the present invention is mounted in the housing.

Then, as illustrated in FIG. 23, a speaker 200 according to the present embodiment can be formed by mounting the third speaker unit 30 at least including the cone diaphragm 1, the curved diaphragm 12, the driver unit 3, the blade piece 5, and the support member 6 into the housing 50.

The speaker 200 formed as described above includes a dynamic type first speaker including the cone diaphragm 1 and a second speaker including the curved diaphragm 12 and can emit sounds that both the hard-of-hearing people and hearing people can hear and that are emitted from the curved diaphragm 12 toward a predetermined direction.

That is, for example, in a case where such a speaker 200 is disposed below an acoustic equipment such as a television, with the protrusion surface of the rounded surface portion being set to face upward, the sounds are emitted upward and a favorable sense of sound pressure can be secured even when hearing at the same height as the acoustic equipment. On the other hand, in a case where the speaker 200 is disposed above an acoustic equipment such as a television, with the protrusion surface of the rounded surface portion being set to face downward, the sounds are emitted downward and a favorable sense of sound pressure can be secured even when hearing at the same height as the acoustic equipment.

Note that, the electric signal inputted to the driver unit 3 in the speakers 100 and 200 may include, for example, a sound signal outputted from a television, a radio, an audio player, a personal computer, a smart device such as a smartphone and a tablet, and so on.

Additionally, although it is not illustrated, a back plate portion of the housing 50 is provided with a hole for mounting an audio jack and a switch.

Therefore, in those speakers 100 and 200, it is possible to enable the reproduction of sound of a wide band (sound wave for hard-of-hearing people and hearing people) by mixing the sound from the dynamic type first speaker including the cone shaped diaphragm and the sound from the second speaker including the curved diaphragm. Additionally, in the speakers 100 and 200, since the driver unit that drives the cone shaped diaphragm and the driver unit that drives the curved diaphragm are common, the manufacturing cost and the weight are reduced. Moreover, with the first speaker and the second speaker integrally provided in a coupled manner, the disposing area can be less and a compact form can be achieved.

REFERENCE SIGNS LIST

1 first diaphragm (cone shaped diaphragm)
1*a* small diameter side
1*b* large diameter side
2, 12 second diaphragm (curved diaphragm)
2*a* one end side
2*b* another end side
2*c*, 2*d* side edge portion
3 driver unit
4 center cap (dust cap)
5 blade
5*a* base end portion
6 support member
61 support plate
62 support surface
63 fixing unit
64 elastic support member
9 cone support frame
10, 20, 30 speaker unit
31 voice coil
32 magnetic circuit
50 housing
100, 200 speaker (hybrid type speaker system)

The invention claimed is:

1. A speaker unit, comprising:

a first diaphragm in a cone shape;

a second diaphragm in a sheet shape forming a rounded surface portion curved from one end side to another end side;

a blade piece in a plate shape to which the one end side of the second diaphragm is attached;

a driver unit that drives the first diaphragm and the second diaphragm via the blade piece; and a support member on which the first diaphragm, the second diaphragm, and the driver unit are mounted, wherein the support member includes:

a support plate in a flat plate shape including an opening of a size from which a large diameter side of the first diaphragm is exposed;

a support surface continuously provided on the support plate and includes a rounded surface portion equivalent to the curve of the second diaphragm;

a fixing unit continuously provided at a terminating end portion of the support surface to attach the other end side of the second diaphragm thereto; and a flexible elastic support member is arranged on the support surface, and in the first diaphragm, a small diameter side is connected to the driver unit, the large diameter side is connected to the support plate of the support member, the blade piece is connected to the driver unit via a center cap attached to a tip end of a voice coil of the driver unit to protrude from the small diameter side to the large diameter side of the first diaphragm, and in the second diaphragm, the one end side is connected to the blade piece, and the other end side is connected to the fixing unit of the support member, and the elastic support member intervenes between a depression surface side of the rounded surface portion and the support surface of the support member.

2. A speaker unit comprising:

a first diaphragm in a cone shape;

a blade piece in a plate shape to which one end side of a second diaphragm is attached, the second diaphragm a sheet forming a rounded surface portion curved from the one end side to another end side; and a driver unit that drives the first diaphragm and the blade piece together, wherein in the first diaphragm, a small diameter side is connected to the driver unit, the blade piece is connected to the driver unit via a center cap attached to a tip end of a voice coil of the driver unit to protrude from the small diameter side to a large diameter side of the first diaphragm, and in the blade piece, a base end side is perpendicular to the center cap and curved in accordance with a curvature of the second diaphragm as being closer to a tip end side.

3. A speaker unit comprising:

a first diaphragm in a cone shape;

a blade piece in a plate shape to which one end side of a second diaphragm is attached, the second diaphragm a sheet forming a rounded surface portion curved from the one end side to another end side; and a driver unit that drives the first diaphragm and the blade piece together, wherein in the first diaphragm, a small diameter side is connected to the driver unit, the blade piece is connected to the driver unit via a center cap attached to a tip end of a voice coil of the driver unit to protrude from the small diameter side to a large diameter side of the first diaphragm, and the blade piece is integral with the center cap.

4. The speaker unit according to claim 1, wherein the second diaphragm is formed of a foamed sheet material.

5. The speaker unit according to claim 1, wherein in the second diaphragm, lengths of opposing two side edge portions along a curving direction are longer than lengths of the one end side and the other end side while the lengths of the two side edge portions are different from each other, and a protrusion surface of the rounded surface portion is oriented to a short side edge portion.

6. The speaker unit according to claim 5, wherein the blade piece is attached obliquely with respect to a horizontal direction or a vertical direction.

7. The speaker unit according to claim 1, wherein the elastic support member is partially arranged on the support surface.

8. The speaker unit according to claim 7, wherein the elastic support member is linearly arranged along a curving direction of the support surface.

9. The speaker unit according to claim 7, wherein the elastic support member is scattered and arranged on the support surface.

10. The speaker unit according to claim 1, wherein the elastic support member is a flocculent member.

11. A speaker formed by mounting the speaker unit according to claim 1 in a housing.

12. A speaker unit, comprising:

a first diaphragm in a cone shape;

a second diaphragm formed as a sheet having a rounded surface portion curved from one end side to an opposite end side;

a blade piece in a plate shape to which one end side of said second diaphragm is attached;

a driver unit configured to drive the first diaphragm and the blade piece together and having a voice coil; and a center cap, wherein in the first diaphragm, a small diameter side is connected to the driver unit, and the blade piece is connected to the driver unit via the center cap attached to a tip end of the voice coil of the driver unit to protrude from the small diameter side to a large diameter side of the first diaphragm.

13. The speaker unit according to claim 12, wherein the second diaphragm is a single sheet having a single curved surface.

14. The speaker unit according to claim 13, wherein both said first and second diaphragms are driven by said single driver unit.

15. The speaker unit according to claim 12, wherein both said first and second diaphragms are driven by said single driver unit.

* * * * *